(No Model.)
G. D. PHIPPEN & J. H. BROWNE.
COUPON CUTTER.
No. 423,950. Patented Mar. 25, 1890.
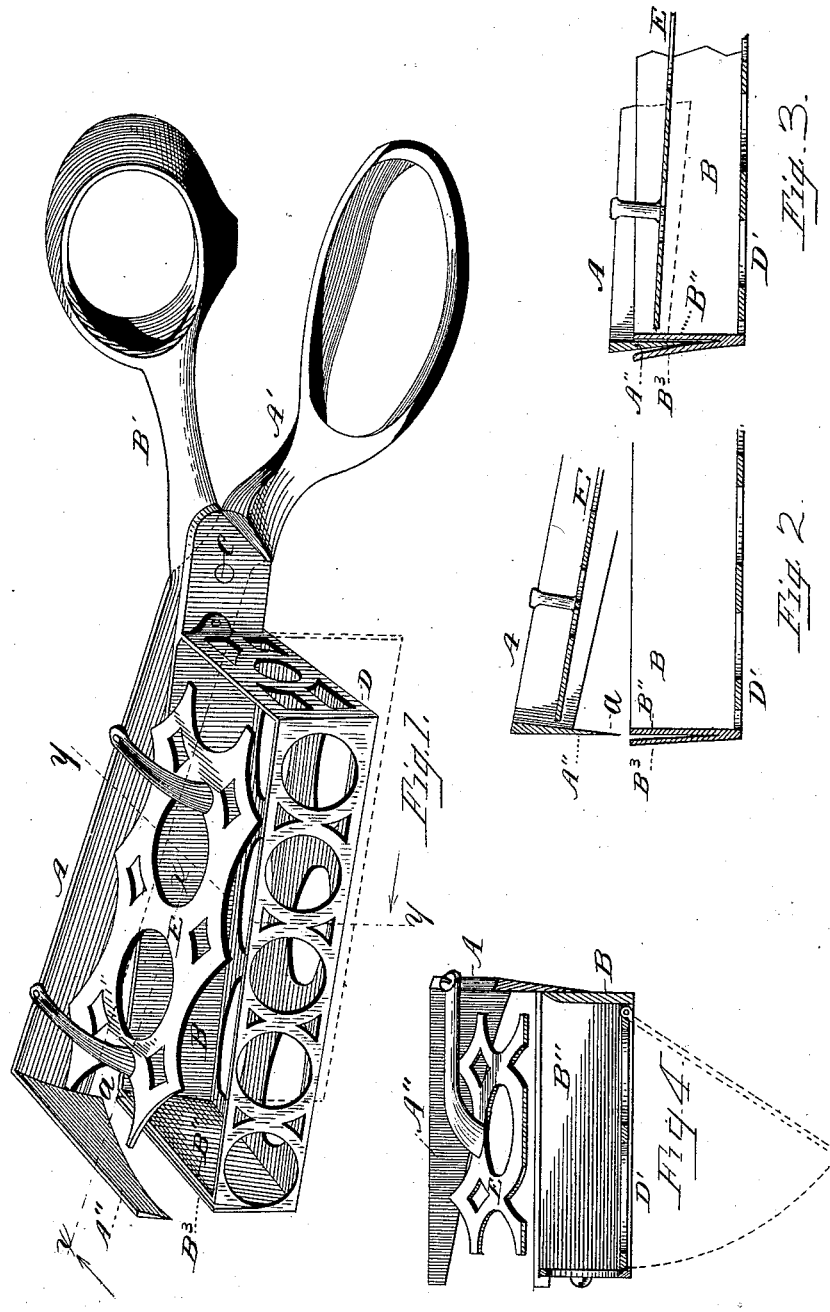
Witnesses:
Geo. W. White
M. J. Jackson
Inventors.
George D. Phippen & Josiah H. Browne
by Nathan Andrew their atty.

UNITED STATES PATENT OFFICE.

GEORGE D. PHIPPEN AND JOSIAH H. BROWNE, OF SALEM, MASSACHUSETTS.

COUPON-CUTTER.

SPECIFICATION forming part of Letters Patent No. 423,950, dated March 25, 1890.

Application filed January 30, 1890. Serial No. 338,598. (No model.)

*To all whom it may concern:*

Be it known that we, GEORGE D. PHIPPEN and JOSIAH H. BROWNE, both citizens of the United States, and residents of Salem, in the county of Essex and State of Massachusetts, have jointly invented new and useful Improvements in Coupon-Cutters, of which the following, taken in connection with the accompanying drawings, is a specification.

This invention relates to improvements on the patent granted jointly to us December 17, 1889, No. 417,366, for coupon-cutters; and it consists in the combination, with one of the right-angle or lateral cutters, of a yielding spring-metal plate, between which and such right-angle cutter the complementary cutter is made to pass during the operation of cutting coupons for the purpose of insuring a clean cut without any liability of creasing or bending the coupon between the edges of the right-angled cutters, as will hereinafter be more fully shown and described, reference being had to the accompanying drawings, wherein—

Figure 1 represents a perspective view of the improved coupon-cutter, shown partly open. Fig. 2 represents a longitudinal section on the line X X in Fig. 1, showing the cutter-blades open. Fig. 3 represents a similar section showing said blades as closed, and Fig. 4 represents a cross-section on the line Y Y in Fig. 1.

Similar letters refer to similar parts wherever they occur on the different parts of the drawings.

A and B are the shears or longitudinal cutters, as usual, pivoted together at $c$, and having respective handles A' and B', as shown.

A'' and B'' are the right-angled or lateral cutters at the ends of the respective longitudinal cutters A and B, in a manner as shown and described in our above-mentioned patent, the cutter A'' being provided with a downwardly-projecting lip or nose $a$, as usual.

D is the basket, secured to the blades B B'', and preferably provided with a hinged or removable bottom D', as shown in said patent, and E is the cover secured to the blade A, as usual.

So far the invention is substantially like what is shown and described and claimed in our above-mentioned patent, and we do not claim such construction as our present invention.

In right-angled shears of this kind the paper is readily cut longitudinally between the shears A and B, but is liable to become creased or doubled without being severed between the lateral shears A'' and B'', unless the latter are very sharp and made to move in very close contact with each other; and for the purpose of obviating such difficulty and causing a clean cut at all times to be made by the lateral blades A'' B'', we provide one of said blades, preferably the lower one B'', with a yielding spring-metal plate or blade B³, the lower portion of which is suitably secured to the blade B'', allowing its upper edge to yield or expand from the latter as the blade A'' passes between the said blade B'' and the expansive part B³, as fully shown in Figs. 2 and 3.

The parts B'' B³ form together what may be termed a "female cutter," between which the male cutter A'' is caused to enter during the cutting operation, by which the desired result is obtained—namely, a clean lateral cut of the coupon or other paper, &c., that is to be severed.

The blade B³ is preferably made expansive or yielding relative to the blade B''; but it may be secured rigidly to it, with a space between them sufficient to receive the upper blade A'', without departing from the essence of our invention; but in practice we prefer to make the blade B³ yielding, so as to allow it to expand during the descent of the blade A'', and thus causing a clean cut to be made at all times between the upper and lower lateral cutters.

What we wish to secure by Letters Patent, and claim, is—

1. The coupon-cutter, as described, consisting of the pivoted longitudinal shears A B and their respective angular cutter-blades A'' B'', combined with a plate or blade B³, secured to the blade B'', to permit the upper blade A'' to pass between said female blades B'' B³, substantially as and for the purpose set forth.

2. The coupon-cutter, as described, consisting of the pivoted longitudinal shears A B and their respective angular cutter-blades A''

B'', combined with a yielding spring-plate B³, secured in its lower end to the blade B'' and adapted to expand from the cutter during the descent of the cutter-blade A'', substantially as and for the purpose set forth.

In testimony whereof we have signed our names to this specification, in the presence of two subscribing witnesses, on this 13th day of January, A. D. 1890.

GEORGE D. PHIPPEN.
JOSIAH H. BROWNE.

Witnesses:
ALBAN ANDRÉN,
GEORGE A. VICKERY.